(12) United States Patent
Boccadoro et al.

(10) Patent No.: US 12,245,049 B2
(45) Date of Patent: Mar. 4, 2025

(54) COMPUTER-IMPLEMENTED METHOD FOR AUTOMATED PLANNING DEPLOYMENT OF RADIO COMMUNICATION DEVICES IN AN ENVIRONMENT

(71) Applicant: NEXTOME S.R.L., Conversano (IT)

(72) Inventors: Pietro Boccadoro, Bari (IT); Domenico Colucci, Bari (IT); Vincenzo Dentamaro, Bari (IT); Laura Notarangelo, Bari (IT); Giangiuseppe Tateo, Bari (IT)

(73) Assignee: NEXTOME S.R.L., Conversano (IT)

( * ) Notice: Subject to any disclaimer, the term of this patent is extended or adjusted under 35 U.S.C. 154(b) by 356 days.

(21) Appl. No.: 17/957,128

(22) Filed: Sep. 30, 2022

(65) Prior Publication Data

US 2023/0139903 A1    May 4, 2023

(30) Foreign Application Priority Data

Sep. 30, 2021  (EP) .................................. 21200226

(51) Int. Cl.
  *H04W 76/10*  (2018.01)
  *H04W 16/20*  (2009.01)
(52) U.S. Cl.
  CPC ................... *H04W 16/20* (2013.01)
(58) Field of Classification Search
  CPC .................................................. H04W 16/20
  See application file for complete search history.

(56) References Cited

U.S. PATENT DOCUMENTS

2006/0218107 A1*  9/2006  Young ............... G05B 13/027
                                                  706/13
2017/0054607 A1   2/2017  Madaiah et al.
(Continued)

FOREIGN PATENT DOCUMENTS

CN    109348403 B    7/2020
WO    2019118453 A1  6/2019

OTHER PUBLICATIONS

European Search Report for EP 21200226 dated Mar. 10, 2022, Munich, DE.
(Continued)

*Primary Examiner* — Michael T Vu
(74) *Attorney, Agent, or Firm* — ArentFox Schiff LLP; Michael Fainberg

(57) ABSTRACT

A computer-implemented method for automated planning deployment of radio communication devices in an environment includes providing a map of the environment including elementary areas representing genes of individuals of a population, defining a fitness function for calculating a fitness score, setting a seed population, calculating a fitness score for the seed population, applying at least one evolutionary step to the seed population to determine a next generation population, calculating a fitness score for the next generation population and comparing fitness scores of the next generation and seed populations. With a difference between the fitness scores of two subsequent populations greater than a threshold value indicative of termination condition, iterating evolutionary step of current population and fitness score comparison, otherwise determining locations in the environment for deployment of the radio communication devices at the elementary areas corresponding to the genes of the individuals having a predetermine value.

16 Claims, 10 Drawing Sheets

(56) References Cited

U.S. PATENT DOCUMENTS

2019/0361896 A1\* 11/2019 Brunets ................. G06F 16/254
2021/0302528 A1\* 9/2021 Wang ........................ G01S 3/46

OTHER PUBLICATIONS

LIN H-P et al., Cell planning scheme for WCDMA systems using genetic algorithm and measured background noise floor, IEE Proceedings—Communications, Aug. 12, 2004, pp. 595-600, vol. 151, No. 6, IEE, GB.

Koza, J. R., Genetic programming as a means for programming computers by natural selection, Statistics and Computing, Jun. 1994, pp. 87-112, vol. 4, Chapman & Hall, GB.

\* cited by examiner

COMPUTER-IMPLEMENTED METHOD FOR AUTOMATED PLANNING DEPLOYMENT OF RADIO COMMUNICATION DEVICES IN AN ENVIRONMENT

CROSS REFERENCE TO RELATED APPLICATION

This application claims priority to and benefit of European Patent Application No. 21200226.5, filed on Sep. 30, 2021, which is fully incorporated by reference herein in its entirety.

FIELD OF THE INVENTION

The present invention relates to the field of radio communication and particularly to the planning of the deployment of radio communication devices intended for communication with one or more user equipment, e.g., but not limited to mobile user equipment, in a target environment, in order for the coverage of the radio communication devices to extend over the whole target environment. In a currently preferred application, the invention is ap-plicable to indoor positioning and localization systems and the radio communication devices are Bluetooth device, preferably BLE devices.

More specifically, the present invention relates to a computer-implemented method for automated planning of the deployment of radio communication devices in an environment.

BACKGROUND OF THE INVENTION

When a radio communication service is offered in an environment to one or more user equipment, such as user mobile communication devices, service radio communication devices intended to transmit and/or receive signals and/or data in the environment when communicating with said user equipment shall be arranged in respective locations that guar-antee coverage of the whole environment, i.e. the capability of the service radio communication devices to receive electromagnetic signals from the user equipment from every location of said user equipment in the environment or to transmit electromagnetic signals to the user equipment at every location of said user equipment in the environment, by meeting predetermined QoS and QoE requirements.

In more specific terms and with regard to an application to indoor positioning and localization systems, the aim of an indoor positioning and localization system is to monitor a predetermined operating environment of interest and detect the presence of entities, such as user equipment, within the operating environment, regardless of their current position. On top of that, the indoor positioning and localization system is arranged to locate all the user equipment within the operating environment. These activities are carried out by monitoring the movements of the user equipment within the coverage of the service radio communication devices (in this application generally known as sensing units or beacons in a Bluetooth technology, and preferably BLE devices) and assessing their distance from the service radio communication devices or, more generally, their position with respect to the service radio communication devices, within a predetermined map of said operating environment, which is stored in, or accessible by, a processing assembly of the indoor positioning and localization system. Such a processing assembly of the indoor positioning and localization system may be distributed among the service radio communication devices (sensing units), may be allocated at a central server unit with which the service radio communication devices (sensing units) are connected, or may be available to each user equipment, as an integrated processing capability of each user equipment or as a remote server with which the user equipment is connected.

Generally, a predetermined operating environment may include at least one room, and usually a number of rooms divided by walls and accessible through gates, and the rooms may have furniture therein. A map representing the operating environment is a model of the local area occupied by the operating environment which may be divided in elementary areas, each of which may include free space available for an individual carrying his/her own user equipment or for a stationary user equipment as well as supporting means for the service radio communication devices, such as a ceiling or a piece of furniture.

Quality of Service, QoS, is measured through predetermined performance parameters which depend upon the communication technology, and in Indoor Positioning Systems based on BLE devices QoS includes for example coverage of a BLE antenna in a linear range up to 100 m in a Line of Sight condition, where if Line of Sight condition is not guar-anteed the linear range is reduced and is a function of the interposed obstacles. In this respect, QoS is considered to be met if the mean squared error is below a predetermined threshold.

Since each operating environment offers peculiar structural characteristics and space allocations, it is always preferable to find an optimal or quasi-optimal solution specific to each operating environment for the deployment of the sensing units. This problem has in-creasing complexity depending upon the size of the operating environment and the number of sensing units or beacons to be deployed.

Given the nature of the user equipment that communicates with a general radio communication service, or the nature of the entities that are to be located in an indoor positioning and localization system (such as IoT devices or user mobile equipment), and given the nature of the radio communication devices of the general radio communication service or the nature of the sensing units in an indoor positioning and localization systems (such as BLE beacons operating according to the Bluetooth protocol v. 4.0 or later versions), these are constrained in terms of computation capabilities, memorization, and energy consumption. As for the former, all the involved devices should exchange low amounts of data. As for the second constraint, all the devices involved in an indoor positioning and localization system should avoid local storage of all the information. Instead, they are communicating all the sensed data as soon as possible. Further, transmission power levels and the communication rate (i.e., the number of transmission/reception operations in a reference time period) must be taken into considerations. In fact, these cannot be high to respect power consumption constraints.

In addition, where communication occurs in ISM radio bands, the fact that such bands are overcrowded shall be taken into account.

In the current art, the deployment of the sensing units in an operating environment is typically empirical and experience-based. Within a map, uniform coverage or a predetermined QoS can be achieved with a minimum number of sensing units, which may depend on the physical extent of the map. However, uniform, and optimal coverage may be achieved with solutions that require a different amount of sensing units. This evaluation is usually associated with a heuristic resolution of the problem, i.e., it requires a trial-and-error process which might be faulty and time consuming. Such heuristic may be related to the amount of sensing units to be deployed, as well as to their deployment positions and structural constraints. This process can be time consuming and may not result in an optimal solution.

Therefore, it is essential to automate this process to achieve optimal results, also by providing a system for implementing the process that is able to learn while operating.

Currently existing deployment algorithms make it difficult to quickly deploy a variable number of networked devices, while guaranteeing that the network is "fully connected", i.e., each device covers a certain area and, as a result, the operating environment is covered as a whole, this latter condition being mandatory to improve the overall quality of the Indoor Positioning System, for example to provide ubiquitous coverage.

SUMMARY OF THE INVENTION

The aim of the invention is to provide a solution for automating the selection of optimal or quasi-optimal deployment locations for service radio communication devices, and particularly for BLE devices, within a predetermined operating environment covered by said service radio communication devices.

More specifically, the aim of the invention is to provide a computer-implemented method that is able to calculate the optimal or quasi-optimal number and location of service radio communication devices within a predetermined operating environment where a radio communication service is to be provided to user equipment that are stationary or moving within said environment. Particularly, the object of the invention is to provide a computer-implemented method that is able to calculate the optimal or quasi-optimal number and location of sensing units of an indoor positioning and localization system within a predetermined operating environment where the indoor positioning and localization system is provided to user equipment that are stationary or moving within said environment.

A further object of the invention is to provide a computer-implemented method that is able to calculate in a fast way the optimal or quasi-optimal number and location of service radio communication devices, such as sensing units of an indoor positioning and localization system, within a predetermined operating environment where a radio communication service, such as an indoor positioning and localization system, is to be provided to user equipment, while minimizing the number of service radio communication devices, such as sensing units, to be deployed in order to reduce the cost and complexity of installation of a radio communication system, such as an indoor positioning and localization system.

According to the present invention, these objects are achieved by a computer-implemented method for automated planning deployment of radio communication devices in an environment as described and claimed herein.

A further subject of the present invention is a system for automated planning of deployment of radio communication devices in an environment.

Particular embodiments are also described.

In summary, the present invention is based on improving known techniques of genetic algorithms, particularly in the context of indoor location and navigation systems.

A genetic algorithm, as disclosed e.g. in Koza, J. R. (1994) "Genetic programming as a means for programming computers by natural selection", Statistics and computing, 4(2), pages 87-112, is a metaheuristic inspired by the process of natural selection that belongs to the larger class of evolutionary algorithms. Genetic algorithms are commonly used to generate solutions to optimization and search problems by relying on biologically inspired operators such as mutation, crossover and selection.

In a genetic algorithm, a population of candidate solutions (called individuals) to an optimization problem is evolved toward better solutions. Each candidate solution has a set of properties (its chromosomes) which can be mutated and altered; traditionally, solutions are represented in binary as strings of "0"s and "1"s, but other encodings are also possible according to the problem to be solved.

The evolution usually starts from a population of randomly generated individuals, and is an iterative process, with the population in each iteration called a generation. In each generation, the fitness of every individual in the population is evaluated. The fitness is the value of the objective function in the optimization problem being solved. The more fit individuals are stochastically selected from the current population, and each individual's genome is modified (recombined and possibly randomly mutated) to form a new generation. The new generation of candidate solutions is then used in the next iteration of the algorithm.

Commonly, the algorithm terminates when either a maximum number of generations has been produced, or a satisfactory fitness level has been reached for the population.

A typical genetic algorithm requires a genetic representation of the solution domain and a fitness function to evaluate the solution domain. The fitness function is always problem dependent and is defined over the genetic representation in order to measure the quality of the represented solution. A standard representation of each candidate solution is as an array of bits. Arrays of other types and structures can be used in essentially the same way. The main property that makes these genetic representations convenient is that their parts are easily aligned due to their fixed size, which facilitates simple crossover operations.

Once the genetic representation and the fitness function are defined, a genetic algorithm proceeds to initialize a population of solutions and then to improve it through repetitive application of the mutation, crossover, inversion, and selection operators.

At the initialization, the population size depends on the nature of the problem, but typically contains several hundreds or thousands of possible solutions. Often, the initial population is generated randomly, allowing the entire range of possible solutions (the search space). Occasionally, the solutions may be "seeded" in areas where optimal solutions are likely to be found.

During each successive generation, a portion of the existing population is selected to breed a new generation. Individual solutions are selected through a fitness-based process, where fitter solutions (as measured by a fitness function) are typically more likely to be selected. A selection method rates the fitness of each solution or of a random sample of the population and selects the best solutions.

Generating a population of solutions from those selected at a previous step occurs through a combination of genetic operators: crossover (also called recombination), and mutation. For each new solution to be produced, a pair of "parent" solutions is selected for breeding from the pool selected previously. By producing a "child" solution using the above methods of crossover and mutation, a new solution is created which typically shares many of the characteristics of its "parents". New parents are selected for each new child, and the process continues until anew population of solutions of appropriate size is generated.

These processes ultimately result in the next generation population of chromosomes that is different from the initial generation. Generally, the average fitness will have increased by this procedure for the population, since only the best organisms from the first generation are selected for breeding, along with a small proportion of less fit solutions. These less fit solutions ensure genetic diversity within the genetic pool of the parents and therefore ensure the genetic diversity of the subsequent generation of children.

Although crossover and mutation are known as the main genetic operators, it is possible to use other operators such as regrouping, colonization-extinction, or migration in genetic algorithms.

This generational process is repeated until a termination condition has been reached. Common terminating conditions are: a solution is found that satisfies minimum criteria, a fixed number of generations or an allocated computation time is reached, the highest-ranking solution's fitness is reaching or has reached a plateau such that successive iterations no longer produce better results.

Advantageously, the present invention finds application in a number of domains of radio communication in an environment, and it is not limited to indoor positioning and localization, though the following description is made with reference to this specific application. Further applications that may be envisaged are in the deployment of Wi-Fi-based networks, or, more in general, Wireless Local Area Networks that can either be short-range or mid-range. The solution can also be applied to Low-Power Local Area Networks, based on the LoRa communication protocol.

To overcome the limitations of the current indoor positioning and localization systems, the present invention provides an automated tool such as a computer-implemented method that is arranged to find the optimal positions for the deployment of sensing units within an operating environment, based on a map of said operating environment.

In the preferred application of the present invention, the computer-implemented method is devised to generate a preliminary solution to the problem of deployment of sensing units in an operating environment of an indoor positioning and localization system, and then to refine it to reach a predefined optimality criteria. As a result of the above operations, the method provides one or more intermediate versions and a final version of the initial map within which the complete deployment is proposed.

The method works using a map of an indoor operating environment as an input, the map being stored on electronic storage means of the indoor positioning and localization system. The map represents a real indoor environment in which a certain number of radio communication entities are either moving or standing still. The information stored in the map are mainly related to presence of walls, wall openings, doors, and perforations through open spaces such as rooms and compartments. The map may further contain information such as thickness and dimensions of walls, bearing columns and further physical obstacles and/or obstructions. Moreover, partitions and other superstructure in the referenced space are con-veniently reported, too. Additional info on furniture and interior items might be included as well. The map is created following a predefined attribute structure that is used to functionally identify each element in it. An attribute may be represented as a color in a visual representation, or image, of the map. Attributes are advantageously used in order to automatically select candidate locations for the sensing units.

Entities that are expected in an operating environment such as a real indoor environment include Mobile Equipment (ME) owned by individuals or individuals may be equipped with an Internet of Things (IoT) device relying on embedded radio transceivers that can exchange data using radio frequency signals. An Internet of Things (IoT) device may also be associated with other live beings, animated or inanimate objects.

In the operating environment, the indoor positioning and localization system includes a set of radio communication devices (sensing units) operating according to a BLE protocol, to be deployed in fixed positions. Once deployed, the sensing units are arranged to detect the presence of radio communication entities within the operating environment based on one of a number of telecommunication technologies and protocols, e.g., by receiving radio frequency signals emitted by the MEs or by the Internet of Things (IoT) devices.

The method uses a set of parameters to work on the map, including a map scale, and an estimated number of sensing units to be deployed in the operating environment. The latter parameter is preliminary evaluated as a function of the area covered by each sensing unit with respect to the map extension.

The sensing units used for monitoring the presence and tracking movements of entities within an operating (indoor) environment are designed to cover a respective area of the environment, e.g., expressed in squared meters. This characteristic is referred to as visibility, and it depends on the physical principle of operation of said sensing units, which is the transmission of electromagnetic waves at given frequencies. From a telecommunication point of view, the sensing units are operating with respect to a predefined communication protocol stack. The sensing units to be deployed are associated with respective coverage areas on the map.

The map is divided in a plurality of elementary areas, in a preferred embodiment the elementary areas being identical. This may be obtained, for example, by superimposing a subdivision grid on the map, such as a regular grid, as a local coordinate system that divides the area of the map in a plurality of elementary areas arranged in rows and columns.

Such a grid is not only a graphical subdivision superimposed on the map for identifying said elementary areas, but it also operates to extrapolate metadata and information about the operating environment from the map, e.g., from a map image. Such a regular grid, e.g. based on juxtaposed (and not superimposed) square elementary areas having a predetermined size, is input to a processing module, configured as a neural network, for example a convolutional neural network, or running a similar machine learning algorithm, which is configured to read the average intensity value of the pixels of the elementary areas in order to assess whether the operating environment in said map position has a wall or other element, instead of free space. The average intensity value of the pixel may either be the intensity value of a color or combination of colors, or the intensity value in the grayscale. This computation stage allows to extrapolate from the map image attribute values of the elements in the map of the operating environment as well as to calculate a related occupation value of the elementary area, and particularly to learn from the map image how many walls exist in the operating environment and where they are located in the environment. Said occupation value is compared with a predefined threshold indicative of the minimum free space for receiving one radio communication device in the elementary area, whereby when the occupation value of the elementary area is greater than said predefined threshold occupancy of the area is detected and no free space is considered available for the deployment of a sensing unit. Specifically, in each elementary area the average intensity value of the pixels in said elementary area is calculated and compared with a predefined intensity threshold indicative of the minimum free space for receiving one radio communication device, e.g., corresponding to at least 50% of said area being a free space. Obviously, other predetermined occupation thresholds other than 50% may be selected. Whether the average intensity value of the pixels in an elementary area is greater than the predefined intensity threshold, then occupancy of the area is detected and no free space is considered available for the deployment of a sensing unit. This information is used for determining which locations of the environment are adapted for the deployment of the sensing units (beacons), i.e. for determining which elementary areas have enough free space to receive the sensing units (beacons) and which elementary areas cannot receive any sensing unit (beacon) due to the presence of an obstacle (typically, a wall).

A further computation stage based on edge detection techniques to learn from the map image how thick the walls located in the operating environment are.

The method makes then use of a genetic algorithm to establish a bijective correspondence between "deployment candidate points" (or elementary areas) on the map of the operating environment and a plurality of subsets of said points (or elementary areas) that are suitable deployment points (or elementary areas) or suitable solutions, that are calculated by the method. The suitable solutions are evaluated and refined by comparing their fitness score which is calculated according to predetermined quality metrics, for instance comprising at least one of (i) the distance between sensing units shall be maximized having regard of their radio communication range; (ii) the number of sensing units shall be kept below or equal to a predetermined maximum amount, which is dependent on the whole area of the operating environment and the radio communication range of the sensing units; (iii) the operating environment is covered with continuity as a whole, (iv) radio signal propagation meets predetermined channel quality indicators and requirements.

Boundary conditions of the method that are to be met in order to achieve an optimal operability of the indoor positioning and localization system are the following:
  elementary areas in the map where obstacles are represented are not to be considered as deployment candidates, the method being able to recognize such elementary areas based on the attribute values of the elements in the map (e.g. an attribute value defining an obstacle such as a wall in the map excludes the corresponding area from the deployment candidate points, but an attribute defining a furniture in the map does not necessarily exclude the corresponding area from the deployment candidate points, as a sensing unit may be in-stalled on a ceiling);
  there are no points inside the map where the detection of an entity is not possible;
  the detection of entities is always possible, no matter if they are stationary, i.e., standing still, or moving, i.e., the position of an entity changes over time;
  tracking the changes in position of the entities can be done in real-time, near real-time, or in batch; by real-time and near real-time, it is meant that tracking activities are carried out with no or little delay with respect to the actual movements; if tracking is done in batch, data are acquired and post-processed for further processing.
  multiple entities can be tracked at any time;
  it is not possible to confuse an entity with another, even if they are standing still in the same point/position or moving similarly, as each entity is identified by a unique identifier which is exchanged in the radio transmission signal or data.

A system for automated planning the deployment of radio communication devices in an environment comprises processing means arranged for performing a computer-implemented method for automated planning the deployment of radio communication devices in an environment as described herein.

BRIEF DESCRIPTION OF THE DRAWINGS

Further features and advantages of the invention will be addressed in the following detailed description of an embodiment thereof, given by way of a non-limitative example, with reference to the attached drawings, wherein.

DETAILED DESCRIPTION

Figure 1:
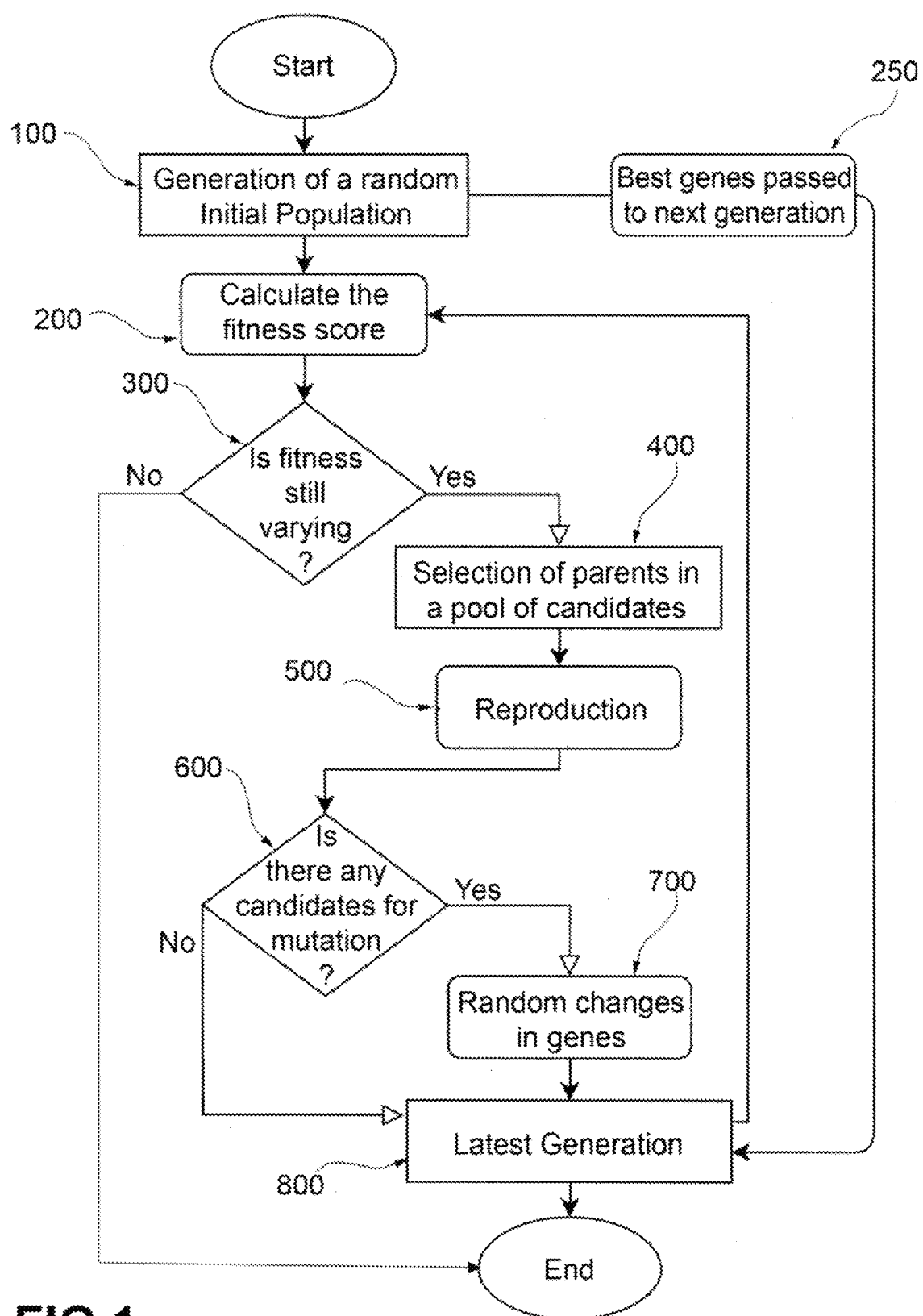
FIG. 1 is a flow chart of the method for automated planning the deployment of radio communication devices in an environment according to the invention, based on a genetic algorithm.

For a more complete understanding of the invention, reference is made to the following description of a preferred exemplary embodiment with reference to the deployment of sensing units an indoor positioning and localization system. A skilled person would understand that the following description may apply to any other application where the deployment of radio communication devices or networked radio communication devices intended for communication with one or more user equipment, e.g. mobile user equipment, is designed in a target operating environment, in order for the coverage of the radio communication devices to extend over the whole operating environment so as to be able to provide a predetermined radio communication service.

The present invention is based on the use of a genetic algorithm applied on a map of an operating environment, which is executed according to a specific pattern. The map of the operating environment is divided in a plurality of elementary areas each one corresponding to a candidate point in the operating environment for the deployment of the sensing units of the indoor positioning and localization system. To this purpose, a subdivision grid may be superimposed on the map, such as a regular grid, as a local coordinate system that divides the area of the map in a plurality of elementary areas arranged in rows and columns. The elementary areas of the map are used as a set of coordinates defined in a bidimensional space, a coordinate being composed by an x position and a y position.

In particular, a "granularity" factor is first defined, which represents the size of the elementary areas of the grid, i.e., of the individual square elementary areas that make up the grid itself.

Since a map image is generally rectangular, it should be noted that the image may be subjected to a "zero-padding" operation to normalize its size. This step may be needed because a grid made up of square elementary areas might not always be usable if superimposed on a rectangular map image, especially when the dimensions of the map image are not multiple of the elementary areas of the square that make up the grid. For example, if an image is 2000 by 1000 pixels and the grid is made up of a matrix of 3 by 3-pixel square elementary areas, it will be necessary to make the image at least 2001 by 1002 pixels.

Such a regular grid, e.g. based on juxtaposed (and not superimposed) square elementary areas having a predetermined size, is input to a processing module, configured as a neural network, for example a convolutional neural network, or running a similar machine learning algorithm, which is configured to read the average intensity value of the pixels of the elementary areas in order to assess whether the operating environment in said map position has a wall or other element, instead of free space, and therefore for determining which locations of the environment are adapted for the deployment of the sensing units. A further computation stage accomplished by known edge detection techniques allows to learn from the map image how thick the walls in the operating environment are. The technique is robust from the point of view of the interference that any furnishing elements can produce as they will not be confused with supporting or structural elements of the operating environment.

The capability to recognize the presence of walls is accompanied by the recognition of the thickness of the wall, which is a factor that makes it possible to distinguish the type of wall itself. In particular, a wall may actually be a partition, for example made up of simple glass supported by a thin frame, or a plasterboard wall that always acts as a divider between rooms but which can contain systems inside it, such as electrical system cables. A third type of wall can be made up of reinforced concrete and therefore be a load-bearing wall. Recog-nizing the type of wall is important because, depending on the material of which it is made and its thickness, the effect on the propagation of electromagnetic waves and in particular on radiofrequency signals is different. The effect on the propagation of the electromagnetic waves is to determine a different drop in the strength of the electromagnetic signals transmitted by the sensing units (beacons).

In a currently preferred exemplary embodiment, two different thickness thresholds may be defined, Th_1 and Th_2, which are related to each other as Th_1<Th_2. Therefore, three distinct types of walls may be identified and the following may be established:
if the wall thickness is less than a certain threshold Th_1, then it is a simple partition;
if the thickness of the wall is greater than threshold Th_1 but smaller than threshold Th_2, then it is a more complex partition, such as a partition in plasterboard or brick or similar material;
if the thickness of the wall is greater than threshold Th_2, then it is a reinforced concrete or load bearing wall.

This information is exploited to define a fitness function that takes into account the drop in the strength of the electromagnetic signals transmitted by the sensing units according to the detected type of the walls in the operating environment, along any propagation direction crossing said walls.

In a model of a genetic algorithm, each coordinate is considered as a gene of an individual. Multiple genes, i.e., a predefined subset of the elementary areas of the map, such as a row or a column of elementary areas in the map, form an individual. Multiple individuals form a population and in this context a population correspond to the whole collection of all the predefined subsets of the elementary areas of the map, i.e., to the whole area of the map of the operating environment. A specific population at a time instant in the evolutionary process is characterized by specific individuals, i.e., by subsets of the elementary areas of the map having specific genes. A gene may assume one of a binary set of values, that identify the presence or absence of a sensing unit in the corresponding elementary area (coordinate) of the map, and an individual is therefore characterized by a specific arrangement of sensing units at the coordinates of the map corresponding to its elementary areas.

Based on the above definitions, after the grid-driven extrapolation of the attribute values of the elements in the map of the operating environment, which includes the detection of obstacles to the deployment of the sensing units and the subsequent detection of walls' thickness affecting propagation of the electromagnetic signals in the environment, the method of the invention operates:
a random initial selection of the population, which corresponds to create a first, preliminary, not optimized, deployment of sensing units, such as a Gaussian distribution in the map space; and
the evolution of the initial or seed population according to a genetic algorithm through a plurality of generations until a predetermined termination condition is met, wherein
a selection of individuals (or genes of individuals) within the population group to be subjected to an evolutionary step is performed (either randomly or based on a fitness score);
the evolution of the population occurs through evolutionary steps including reproduction (crossover) and—optionally—mutation
the evolutionary quality of the population is calculated by a fitness function,
the termination condition is based on a fitness score of the population.

According to the method of the invention, each elementary area or point in the map could be a "deployment candidate point". Nevertheless, among the set of "deployment candidate points", only a randomly selected subset will be used as suitable solutions (a solution domain) for the deployment of the sensing units. The genetic algorithm is executed on said suitable solutions and includes modifications of said solutions according to genetic operators such as crossover and mutation in subsequent evolutionary steps. The method further ad-dresses the aspect of choosing the "suitable solutions" based on the discretization of the fitness function of the acceptable solutions. This is obtained by applying e.g., a stochastic acceptance technique whereby the fitness score of each individual is compared with a reference value, which is randomly generated at each iteration of the genetic algorithm, and individuals having a higher fitness score may be elected to be part of the final solution or do not undergo an evolutionary step towards a next generation. In a set of suitable solutions, a subset is selected to respect a specific criterion related to the maximization of the distances between the points that are considered for the deployment of the sensing units. By respecting the constraint on the maximization of the distances, the effective number of sensing units to be deployed can be lower than the solution found in the previous iterations.

FIG. 1 is an exemplary flow chart of the method according to the invention.

At the start, after the grid-driven extrapolation of the attribute values of the elements in the map of the operating environment, a random initial or seed population is generated at step 100 and a fitness score of this population is calculated at step 200 according to a predetermined fitness function. A fitness score for each individual is also calculated and compared with a predetermined random threshold, so that individuals that have a fitness score higher than said threshold (individuals having "best genes") are passed to the next generation at step 250 without undergoing any evolutionary step. At step 300 the calculated fitness score is compared with the fitness score calculated at the previous iteration in order to determine whether it varies over the previous fitness score for a value greater than a predetermined threshold value. The threshold value may be an absolute value or a percentage value. If the difference between the fitness score of the current population and the fitness score of the previous population is greater than the threshold value, the method applies evolutionary steps of the genetic algorithm, including, e.g., a selection of parent individuals in a set of candidate individuals at step 400 either random or based on their fitness score (individuals that have a fitness score higher than the predetermined, preferably random, threshold are not selected) and a reproduction (crossover) step 500 for determining a different population. This population is then subject to the selection or identification of individual candidates for mutation at step 600 and if any those individuals are subjected to mutation a random change in their genes occurs at step 700. For example, individual candidates for mutation are selected randomly or among individuals having the fitness score lower than a predetermined, preferably random, threshold. The result at step 800 is a next generation of the population, for which the respective fitness score is calculated at step 300.

An iteration of the method is carried out in order to calculate further generations of the population, until the difference between the fitness score of the current population and the fitness score of the previous population is lower than the threshold value (termination condition), and the iteration of the genetic algorithm ends, the method electing the latest population as the optimal or quasi-optimal solution.

It may occur that the calculated fitness score is worse that the fitness score calculated at the previous iteration. If this is the case, in response to determining that the fitness score for the current population is worse than the fitness score of the previous or seed population, the step of setting a seed population of candidate individuals by generating random values of the genes of said individuals or the step of applying at least one predetermined evolutionary step to at least a subset of the previous population of candidate individuals, so as to determine a next generation population, is repeated. This may be made dependent on the condition that that the calculated worse fitness score differs from the fitness score of the previous population for a value greater than a predetermined threshold value indicative of a termination condition, whereas if the calculated worse fitness score differs from the fitness score of the previous population for a value lower than the predetermined threshold value indicative of a termination condition, the iterations are ended and the method elects the latest population as the optimal or quasi-optimal solution. As an alternative, where the calculated worse fitness score differs from the fitness score of the previous population for a value greater than a predetermined threshold value indicative of a termination condition, the iterations are ended and the method elects the latest population as the optimal or quasi-optimal solution.

The flow chart shows that the genetic algorithm of the method works on top of a continuous evaluation of the fitness function, which can be defined as an indicator of the quality of the current population.

Specifically, the fitness function is a quality indicator of the selected population. It is used to identify whether the proposed solution is better when compared to the previous one. The leading criterion of this phase is the maximization of the distances between all the sensing units to be deployed in the operating environment, in a preferred embodiment by taking into account the attribute values of the elements in the map of the operating environment, i.e., the obstacles in the environment. This implies the maximization of the distances between the candidate points for the deployment. The sensing units are considered as properly deployed if their distance with respect to all other candidate points is higher or, at least, equal to the previous phase. To each proposed deployment solution, a score is given. The higher the score, the better the fitness. This comparison is carried out for each evolutionary step.

The selection of a suitable fitness function, as well as the definition of its parameters and its domain represent key factors in the choice of the optimal solution because they allow the algorithm to converge more or less quickly. Depending on the fitness function that is chosen, in fact, it is possible to reach different results not only by converging at different times but also by reaching optimal results that are different from each other.

The problem, therefore, is a problem of optimizing the result obtained by the fitness function. In particular, the goal is to minimize a function that takes into account: (i) the distance between the sensing units deployed in the map, (ii) the number of walls that are interposed between the sensing units, and (iii) the type of each of the walls in between the sensing units. This goal may be achieved, for example, by minimizing a function representative of the arrangement of the (deployment sites of the) sensing units in the operating environment. In this case, any reference in this description to a fitness score higher than, or greater than a reference or threshold value (which is typical of an optimization problem of maximizing the fitness function) shall be intended as a reference to a fitness score lower than said reference or threshold value.

The following is mathematical explanation of the definition of the fitness function for the purposes of the invention, where the possible arrangements of the deployment sites of the sensing units, that are the result of the calculated iterations of the genetic algorithm, are evaluated based on the distance between the sensing units, the signal strength received at the user equipment at any possible location in the operating environment and the propagation conditions that take into account the drop in the strength of the electromagnetic signals transmitted by the sensing units according to the detected type of obstacles in the operating environment, along any propagation direction crossing said obstacles.

If $(P_i)_{i=1, \ldots, n}$ designates the set of n deployment sites whose optimal arrangement in the operating environment is to be calculated, the aim of the invention is to find for each $P_i$ respective optimal coordinates $(x_i, y_i)$.

For each pair $(P_i, P_j)$ belonging to the set of simple combinations of sequences of two elements form the set $(P_i)_{i=1, \ldots, n}$ from the Friis equation it is possible to define the function:

$$P_{R_{i,j}} = P_T \frac{G_T G_R \lambda^2}{(4\pi)^2 R_{i,j}^2}$$

where:

$R_{i,j}$ is the Euclidean distance between the pair of deployment sites $(P_i(x_i, y_i), P_j(x_j, y_j))$. $R_{i,j}$ is a function of the sites coordinates and may be indicated as follows: $R(x_i, y_i, x_j, y_j)$.

$G_T$ and $G_R$ are the gains of the antennas (compared to an isotropic antenna), $\lambda$ is the wavelength of the radio communication carrier If $$(C_K)_{K=1, \ldots, \frac{n!}{(n-2)!2}}$$

is the set of simple combinations of sequences of two elements from the set $(P_i)_{i=1, \ldots, n}$, given the pair $$C_K = (P_i, P_j) \in (C_K)_{K=1, \ldots, \frac{n!}{(n-2)!2}}$$

it is possible to write the above formula as:

$$P_{R_k} = P_T \frac{G_T G_R \lambda^2}{(4\pi)^2 R_k^2}$$

and, having set a specific arrangement of deployment sites $(P_i)_{i=1, \ldots, n}$ the fitness function below may be defined $$\hat{P} = \sum_{k=1}^{\frac{n!}{(n-2)!2}} \left( P_{R_k} * \sum_{j=0}^{h} t_{k_j} \right) + \sum_{i=1}^{n} \sigma\left( P_{R_{i,t}}, P_{R_{i,s}}, P_{R_{t,s}} \right)$$

where:

$t_{k_j}$ is a loss constant of the signal associated with the j-th obstacle (wall) belonging to the set of h obstacles between the two sites of the combination $C_K$, and depends on the thickness of the detected obstacles, which is calculated by edge detection techniques $P_{i_s}, P_{i_t}$ are the sites closest to $P_i$ from a Euclidean viewpoint $\sigma$ is the standard deviation The fitness function P is therefore to be minimized. If $(\text{Conf}_i)_i$ defines the set of analyzed deployment site arrangements, the aim is to find the optimal arrangement that min-imizes the function P $(\text{Conf}_i)$. Thus, the optimization of the fitness function is the solution of a minimum problem as $$\min_{Conf_i \in (Conf_i)_i} \{\hat{P}(Conf_i)\}$$

Therefore, achieving the aim of minimizing the above-defined fitness function means that a minimum transmission power can be set for each sensing unit (beacon), which, in the operating environment, has the advantage of reducing energy consumption by both the sensing units and the user equipment, making the batteries of the sensing units and the user equipment last longer, and reducing the need and frequency of maintenance work to be carried out on the system of sensing units.

In order to appreciate how the presence of obstacles affects the propagation of electromagnetic signals and particularly reduces the signal strength across an obstacle, one may refer to the Friis transmission equation. Starting from the Friis transmission equation, it is known in the literature that the formula that allows to calculate the distance of an element that detects a signal from the source of the signal itself is:

$$d \approx d_0 \cdot 10^{\left(\frac{\pi_{TX} - \pi_{RX} + \pi_0 - \sigma_G}{10\gamma}\right)}$$

where d is the linear distance between the signal source and the signal receiver; do and zco are, respectively, the reference distance and the signal strength measured at a known distance (typically at 1 m); the factor $\pi_{TX} - \pi_{RX}$ is the difference between the transmitted signal strength and the received signal strength measured at the receiver; GG is a model of the noise superimposed on the signal. The latter is always considered to be Gaussian. The factor $\gamma$ is the so-called "path-loss exponent", that is a value that is used to model the signal loss due to its propagation in a real environment. The value of this factor may be determined empirically by knowing table values which represent a qualitative average of experimental results and scientific studies, or it may be calculated as the result of dedicated metrics or customized criteria that take into account the infrastructure within which signal propagation occurs.

The above relates to a single pair of transmitter and receiver, but the invention considers a plurality of transmitters and a plurality of receivers.

Obviously, in any case the system requires signal coverage provided by at least three sensing units (beacons).

In the genetic algorithm the evolutionary steps include mechanisms of "elitism", "crossover" and "mutation" that constitute variants to the evolutionary process:

The "elitism" is a mechanism that allows the best individuals of the population, i.e., those with higher fitness, to be selected as preferred individuals. When "elitism" is used, the best individuals are selected as primary solutions and are passed to the next generation without being subjected to any evolutionary step. Best individuals are individuals that contribute most to the fitness score of a population, i.e., have a higher own fitness score.

The "crossover" mechanism is used to maintain a certain diversity among individuals in a population. This mechanism implies that among individuals in a population, a higher degree of diversity is achieved by crossing over genes among individuals.

The "mutation" mechanism is used to maintain a certain diversity among generations of individuals. When this operator is used, individuals belonging to a given population have a certain degree of diversity with respect to the previously found solutions.

Advantageously, the "elitism", "crossover", and "mutation" mechanisms are applied in the genetic algorithm since keeping sufficient diversity and avoiding premature convergence contribute to achieve an optimal or quasi-optimal solution. These techniques are com-plementary and can be employed if needed, since the optimization process can be carried out with one or more of them included.

Figure 2:
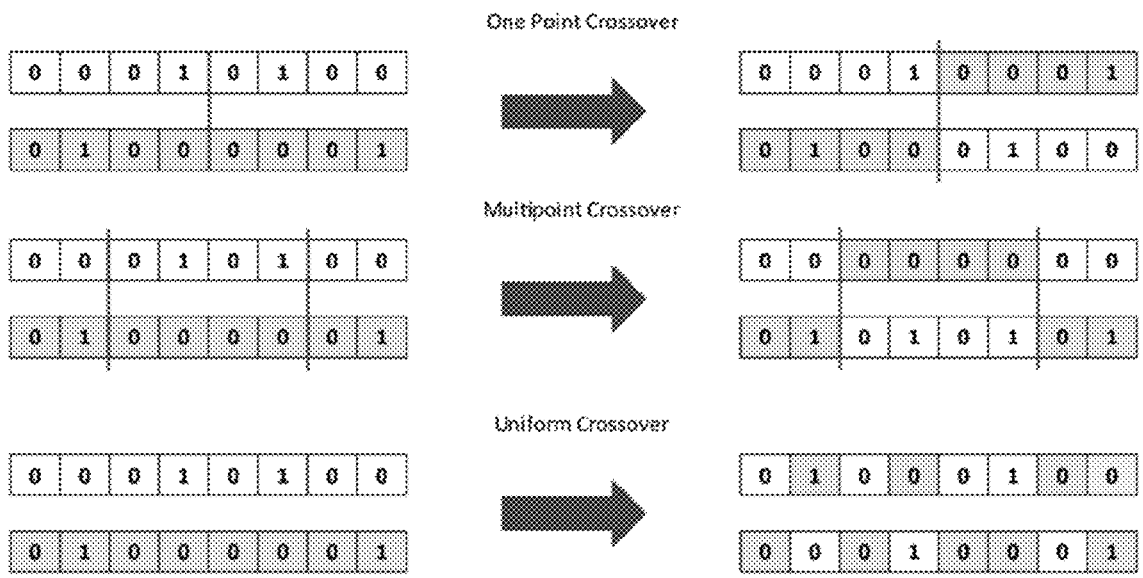
FIGS. 2 and 3 show crossover mechanisms and mutation mechanisms, respectively, applied by the genetic algorithm of the method according to the invention.

FIG. 2 shows crossover mutation mechanisms in brief. Each gene has a value 0 or 1, where value 1 represents a deployment point in the map. The figure summarizes the main possibilities in terms of crossover between chromosomes representing individuals. In particular, the crossover between chromosomes may happen with a "single-point" mechanism, which implies that chromosomes are split in half, and one half sequence of genes is swapped. In the "two-point" case, chromosomes are split into three subsequences that are alternately swapped. In the third case, namely "uniform" crossover, the single genes of the sequences are alternately swapped.

Figure 3:
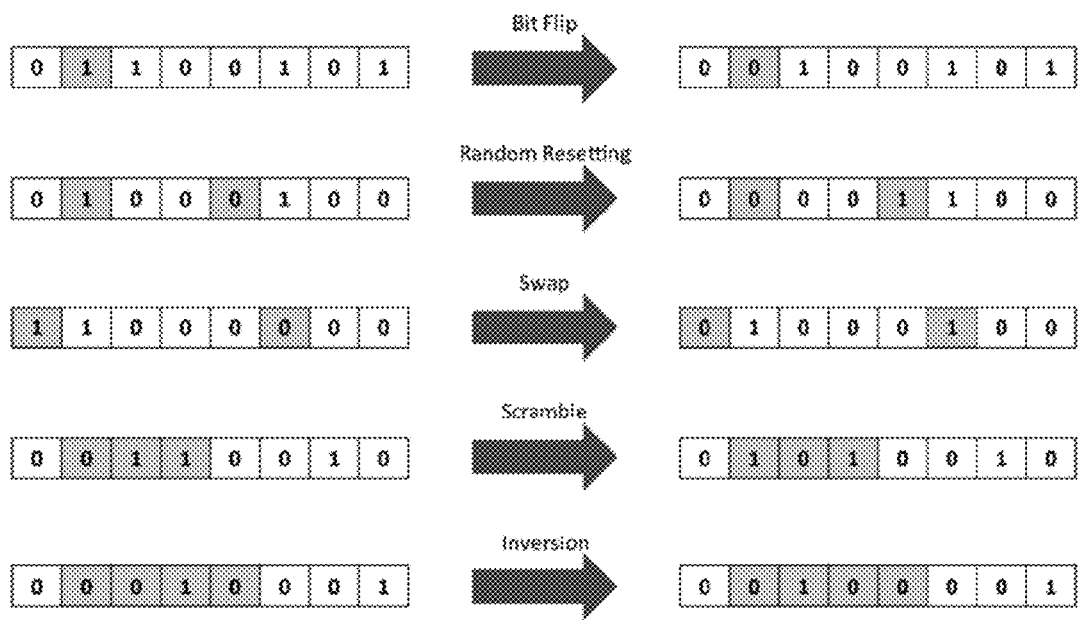

FIG. 3 shows the mutation mechanisms in brief. Each gene has a value 0 or 1, where value 1 represents a deployment point in the map. According to the possible chromosome representations of individuals, the mutation process of an individual may happen according to different mechanisms, such as e.g. Bit Flip, for the binary representation, Random Resetting, which involves a random selection of the genes in the chromosome whose value is inverted, a simple Swap mechanism, based on a random selection of the genes to be mutated by swapping between them, a Scramble mutation mechanism that shuffles a random number of genes, and an Inversion mechanism where a set of genes are mutated in the re-verse order.

Advantageously, the described algorithm of FIG. 1 calculates the optimal solution with respect to the following additional constraints, which are applied at least at the generation of the initial population (at step 100 in the flow chart of FIG. 1) and/or when a next generation of the population is calculated (at step 800 in the flow chart of FIG. 1):

A maximum amount of sensing units can be deployed in the operating environment. The maximum amount of sensing units to be deployed in a map is determined according to the ratio between the map size and the coverage capability, or the average coverage capability, of a sensing unit as is preferably determined by adding to the value of the ratio between the map size and the coverage capability plus an additional predetermined percentage of said value. This number can be known a priori and represents an upper bound.

A minimum number of sensing units must be deployed in the operating environment. The minimum amount of sensing units to be deployed depends on heuristic criteria. As a preferred design criterion, the minimum number is equal to three.

The maximum amount of sensing units can be easily derived according to the way this system works. For each ME, the coverage area is considered as the region of space in which it is able to reveal the presence of at least one sensing unit. It might happen that more than one sensing units are in radio visibility conditions at the same time. Any amount of sensing units which is within this range can be considered as acceptable. Nevertheless, it is an algorithm's objective to keep the number of sensing units as low as possible.

The minimum amount of sensing units has been defined to be able to avoid false positive, wrong location detections, and unreliable measurements.

The disclosed deployment method is designed to allow radio visibility between sensing units and MEs or any other entity to be located in the operating environment. Radio visibility is assumed to be reliable if a dedicated constraint is respected. The envisioned constraint considers radio quality indicators, such as Received Signal Strength Indicator (RSSI), Channel Quality Indicator (CQI), Connection Channel Information (CCI), Reference Signal Received Quality (RSRQ), Signal to Interference plus Noise Ratio (SINR), depending on the radio communications service that is provided in the operating environment. The specific radio quality indicator depends on both the radio frequency technology used in the operating environment and the selected measurement point. The method is designed to involve even multiple radio technologies at the same time. For instance, with IEEE 802.11 (namely Wi-Fi), or Bluetooth, technologies, the RSSI will be involved as a reference metric on the receiver's side for evaluating the quality of the received signal. In the Ultra-Wide Band (UWB) technology, the reference power level is only evaluated for the sake of completeness, since this technology leverages the Time of Arrival (ToA) to carry out ranging operations. The RSRQ, which measures the received power with respect to the reference power level, is tightly linked to the RSSI, but it involves a reference power level. In each aforementioned solution, a CQI can be derived at the receiver's side evaluating the involved modulation scheme to derive the efficiency and propose further enhancements. For each of them, a respective threshold mechanism is involved, as the coverage area of both MEs and sensing units strongly depends on the radio frequency technology in use. This constraint is provided as an input to the method in order to define the coverage area of each radio communication device, and therefore it is used in the determination of the constraint of maximum amount of sensing units.

In order better to understand the application of the described method for the deployment of sensing units or beacons in an operating environment of an indoor positioning and localization system, FIGS. 4-11 show an example of an indoor environment and related maps and their correspondence with the population used by the genetic algorithm of the method according to the invention, during subsequent steps of the method.

Figure 4:
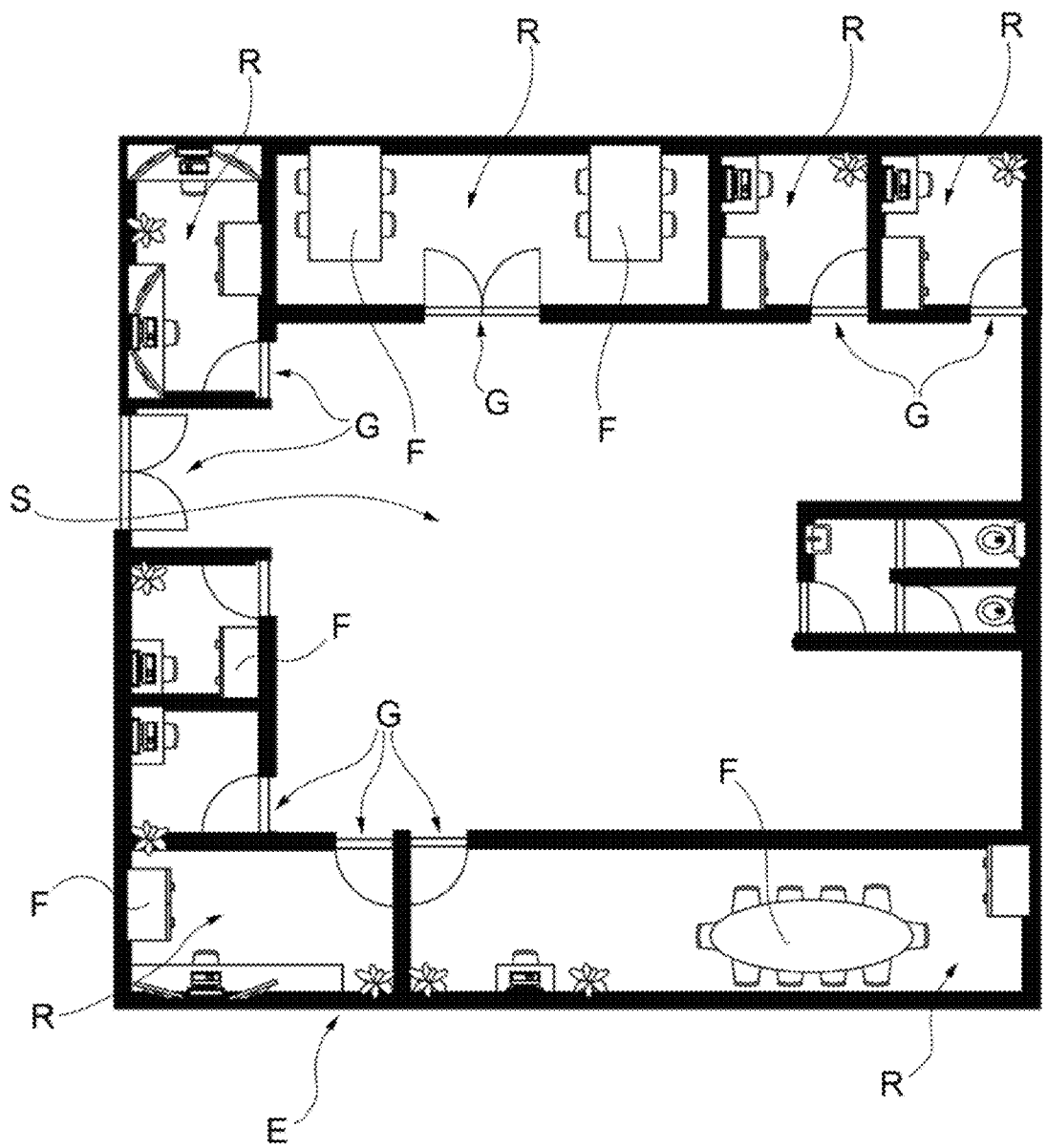
FIG. 4 is an example of an indoor environment.

Specifically, FIG. 4 is an example map of an indoor environment E with different rooms R communicating with an open space S through respective gates G, and furniture F (only some exemplary pieces of furniture are identified in the drawing); FIG. 4 show a prototypical map of the area of interest. It can be an office or a workplace. Here rooms are variable in size and destination use.

Figure 5:
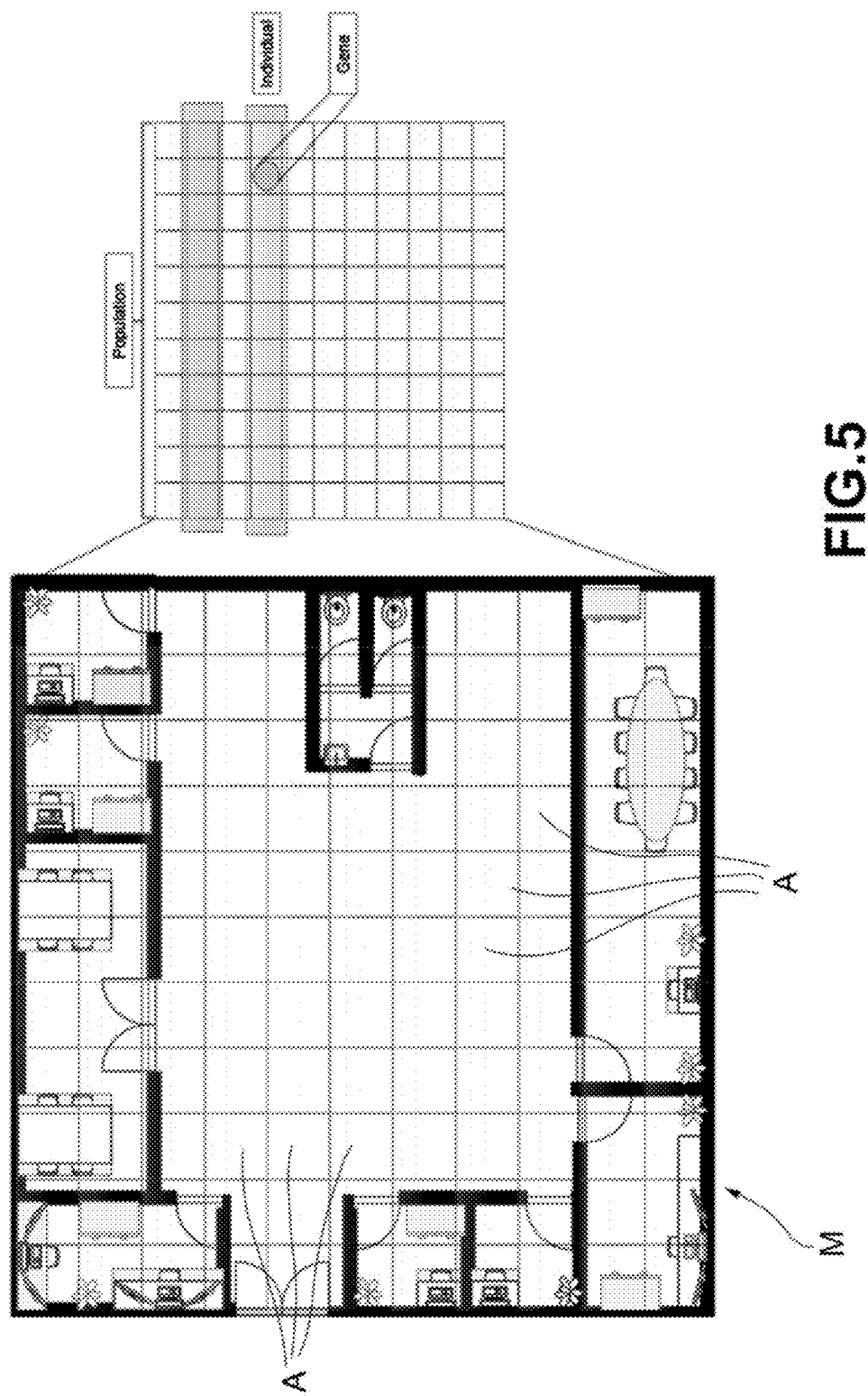
FIG. 5 is a map of the indoor environment and an example of correspondence between elementary areas (or points) in a map and the population used by the genetic algorithm of the method according to the invention.

FIG. 5 is an example of bijective correspondence between the points in a map M and the population used by the genetic algorithm. Each row of the population, which corresponds to a row of elementary areas in the map, is an individual. For each elementary area or point A of the map M (only a few elementary areas are identified for clarity purposes), a couple of coordinates are used, i.e., x and y, to identify the point in the map. Each coordinate (gene) is either marked with a "Y", in case it is considered as a point of interest for the deployment, or empty, when it is not chosen as a deployment candidate.

Figure 6:
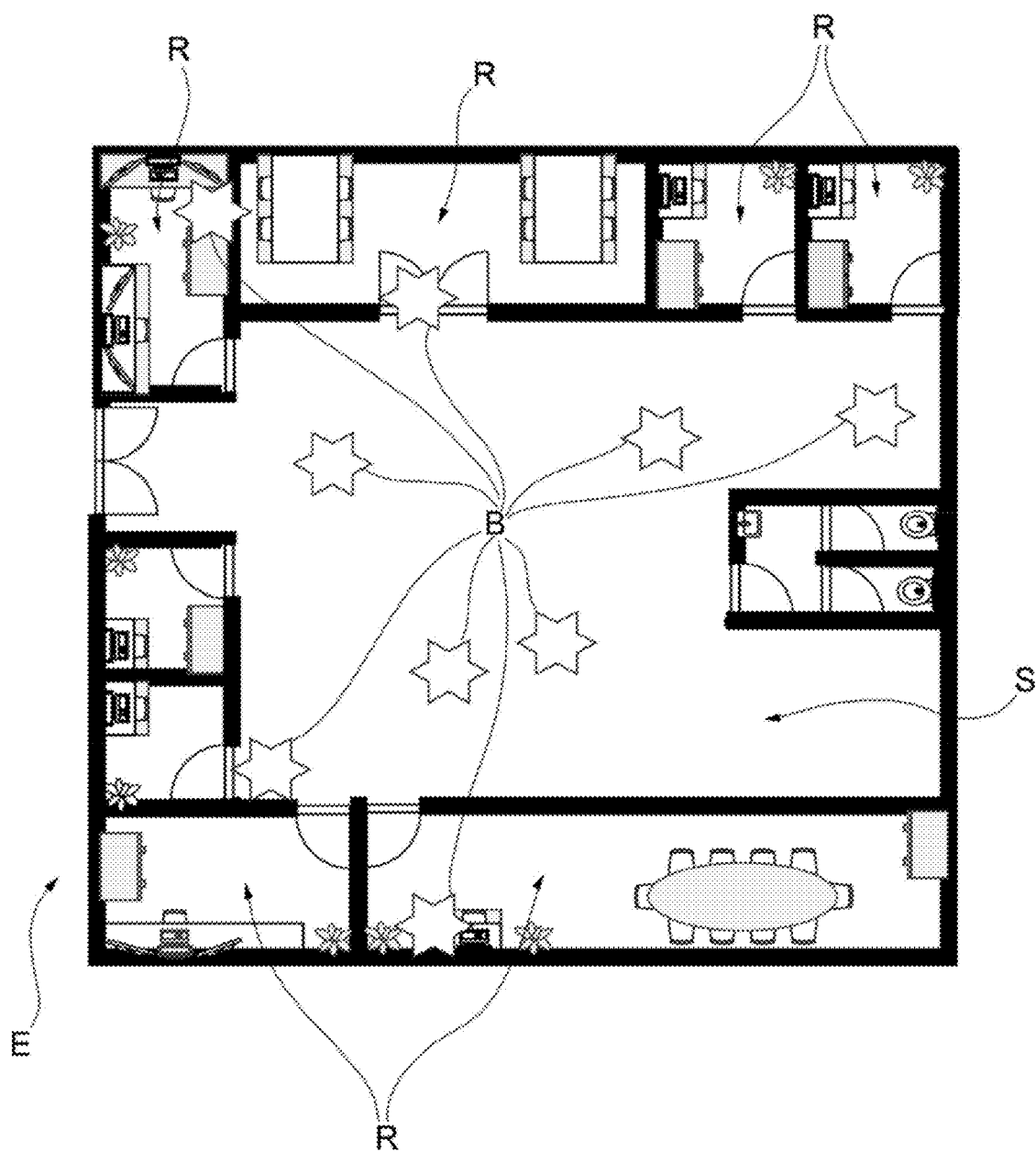
FIG. 6 is an example of intermediate solution calculated by the method according to the invention that is discarded because suboptimal.

FIG. 6 is an example of an intermediate solution that is eventually discarded at the end of the evolutionary process. This depends on the fact that the amount of sensing units or beacons B deployed in the operating environment E can be lowered. This is even more so, since the distances between some of them has not been maximized, which results in an in-efficient coverage of the operating environment.

Figure 7:
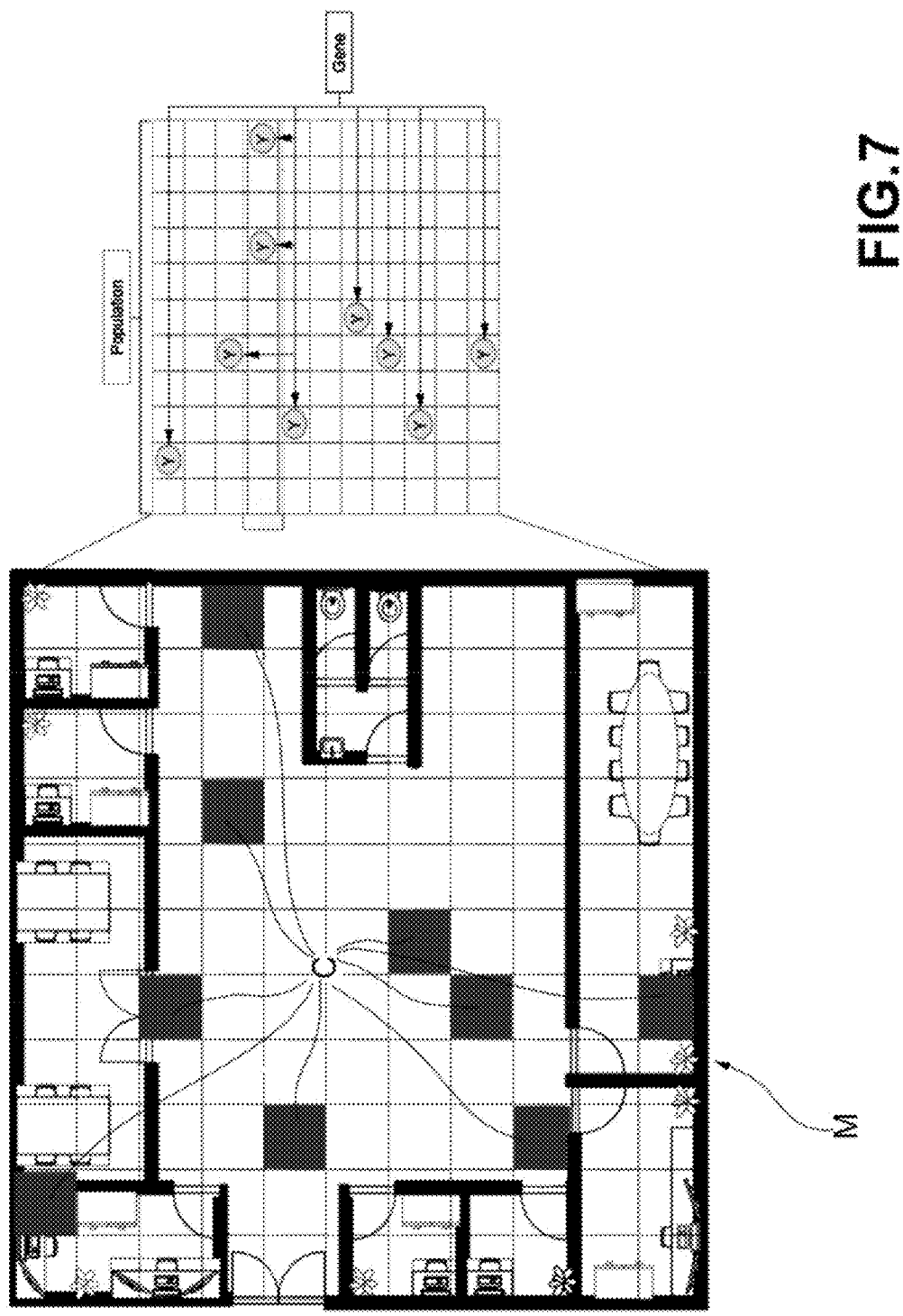
FIG. 7 is a representation of the grid subdivision for the intermediate solution of FIG. 6 and the corresponding population calculated by the genetic algorithm.

FIG. 7 is a representation of a grid subdivision of the map M and of the corresponding population used by the genetic algorithm for the intermediate solution of FIG. 6. The concept of the bijective correspondence between an elementary area or point C in the map M that can be considered as a candidate for the deployment and the chromosome of an individual in a population is clearly shown.

Figure 8:
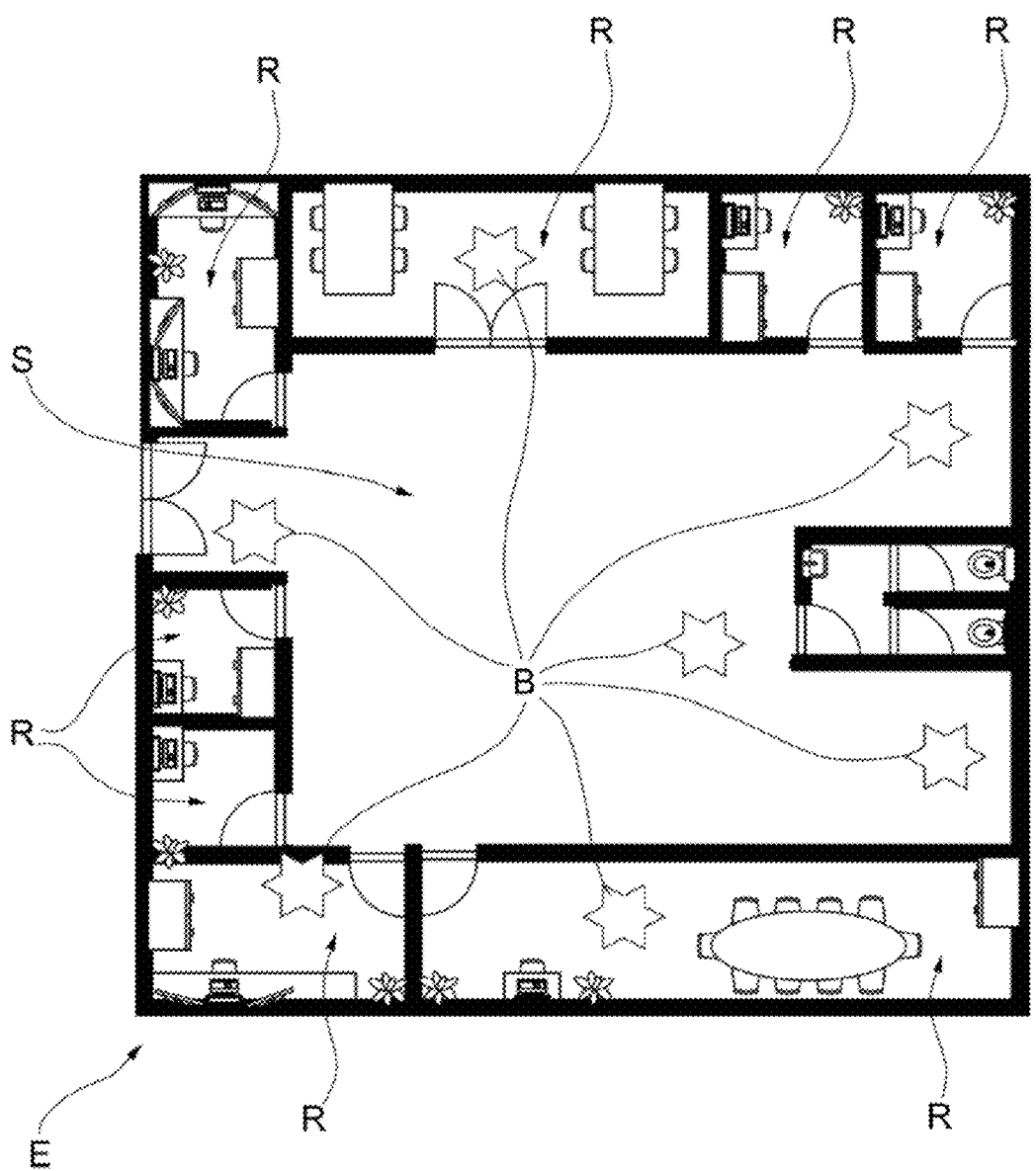
FIG. 8 is an example of a further intermediate solution calculated by the method according to the invention, with a decreased number of sensing units to be deployed.

FIG. 8 is an example of an intermediate solution with a decreased number of sensing units or beacons B to be deployed. The Figure demonstrates an example of identified candidate positions in the operating environment E.

Figure 9:
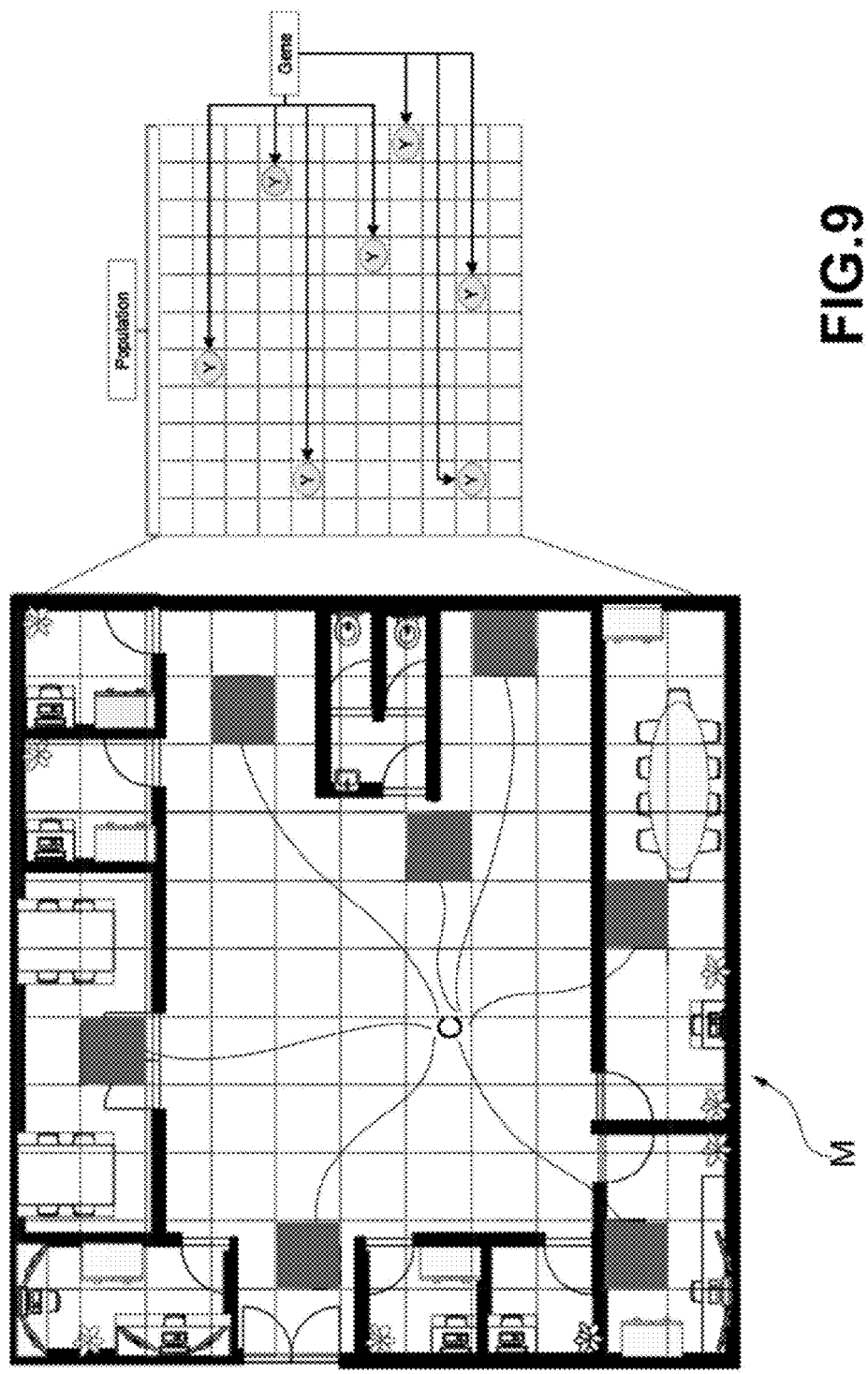
FIG. 9 is a representation of the grid subdivision for the further intermediate solution of FIG. 8 and the corresponding population calculated by the genetic algorithm.

FIG. 9 is a representation of a grid subdivision of the map M of the operating environment E and of the corresponding population used by the genetic algorithm for the solution of FIG. 8. Similarly to FIG. 7, this shows the bijective correspondence between an elementary area or point C on the map that is candidate for the deployment and the population.

Figure 10:
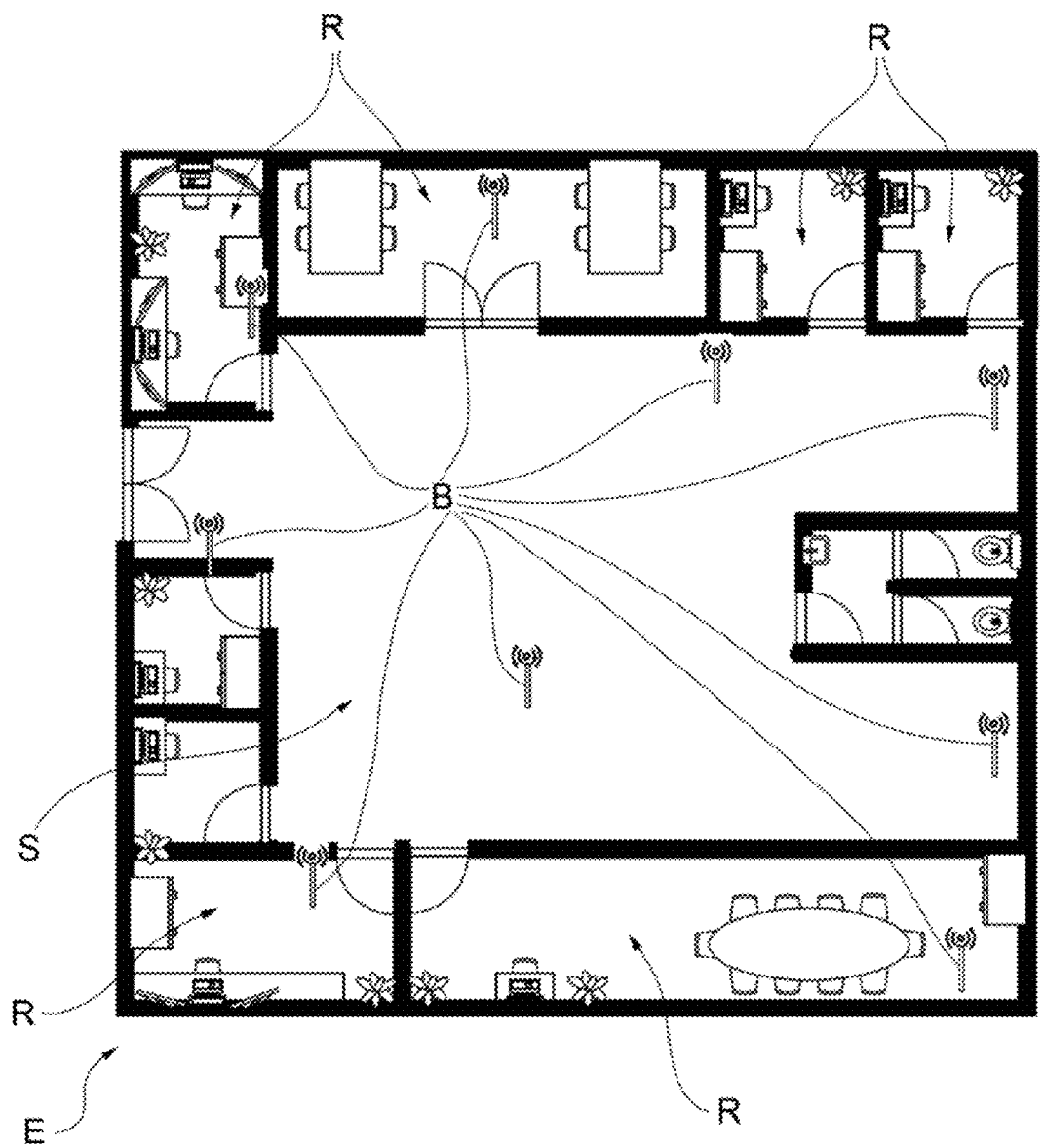
FIG. 10 is an example of a final solution calculated by the method according to the invention, with sensing unit deployment over the map of the indoor environment.
Figure 11:
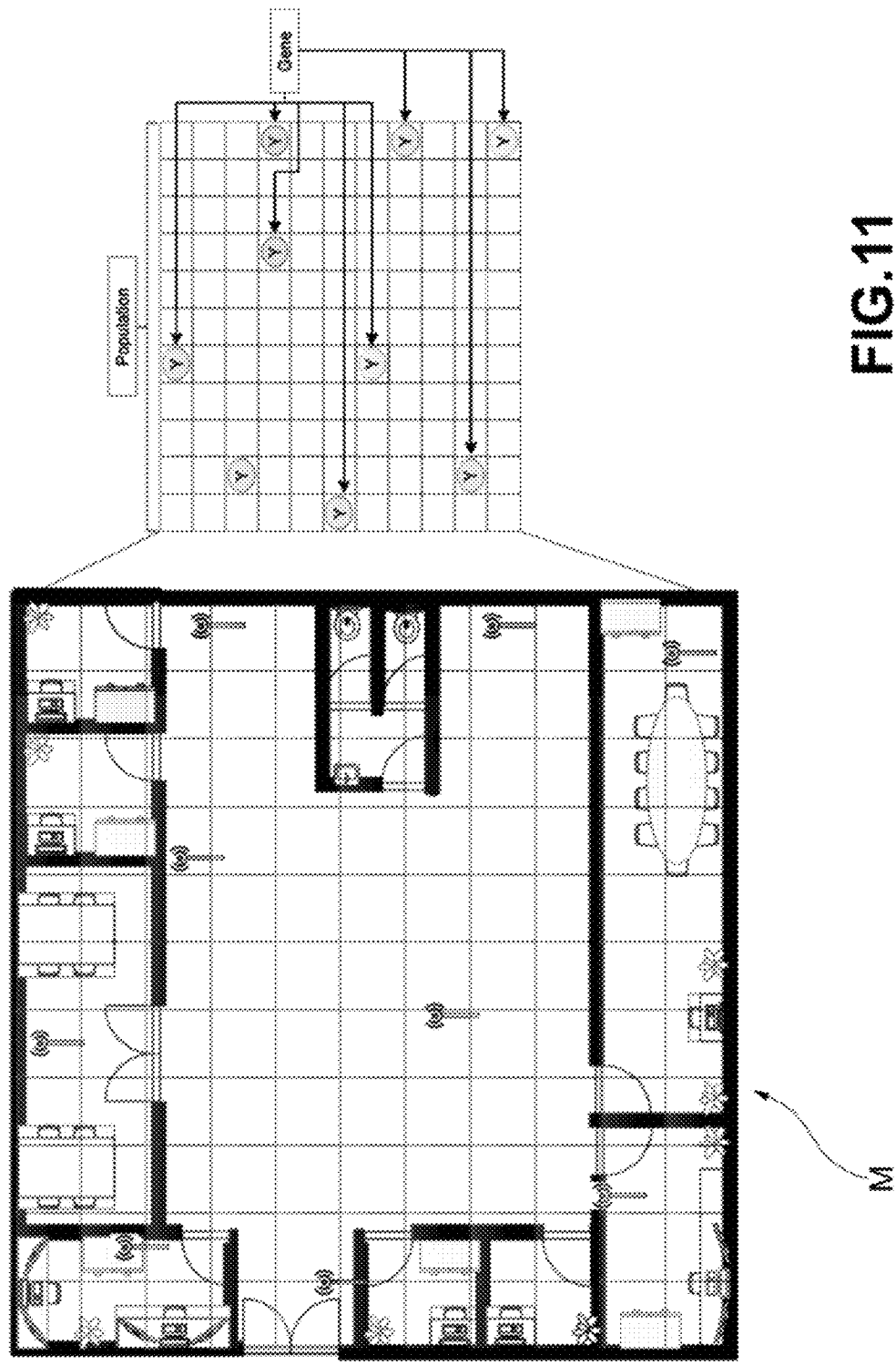
FIG. 11 is a representation of the grid subdivision for the final solution of FIG. 10 and the corresponding population calculated by the genetic algorithm.

FIG. 10 is an example of sensing units or beacons B deployed within the operating environment E. It is a high-level description of the final output of method of the invention as achieved and the end of the iterations disclosed in the flow chart of FIG. 1. Sensing units or beacons B are deployed in a certain number of optimal positions. FIG. 11 is a representation of the grid subdivision of the map M and of the corresponding population calculated by the genetic algorithm for the final deployment.

Of course, the principle of the invention remaining the same, the embodiments may be widely varied with respect to what has been described and illustrated purely by way of non-limiting example, without thereby departing from the scope of protection of the invention which is defined by the attached claims.

What is claimed is:

1. A computer-implemented method for automated planning deployment of radio communication devices in an environment, the computer-implemented method comprising the steps of:
    a) providing a map of said environment including a set of elementary areas, each elementary area representing a location of the environment suitable to host a radio communication device, wherein a partition of the set of elementary areas defines a plurality of subsets of elementary areas representing individuals of a population in a genetic representation of a solution domain to the deployment of radio communication devices in said environment, each elementary area corresponding to a gene of an individual that may take on one of a binary set of values including a first value representative of the presence of a radio communication device at a location of the environment corresponding to said elementary area, and a second value representative of the absence of a radio communication device at a location of the environment corresponding to said elementary area, each individual being characterized by values of its genes,
    b) defining a fitness function representative of an arrangement of the radio communication devices in the environment for calculating a fitness score of a population of individuals depending upon predetermined metrics comprising at least the maximization of distance between radio communication devices in said environment;
    c) setting a seed population of candidate individuals by generating random values of the genes of said candidate individuals;
    d) calculating a fitness score for the seed population of candidate individuals based on said fitness function;
    e) applying at least one predetermined evolutionary step to at least a subset of the seed population of candidate individuals so as to determine a next generation population;
    f) calculating a fitness score for the next generation population and comparing the fitness score of the next generation population with the fitness score of the seed population, and in response to determining that the fitness score for the next generation population differs from the fitness score of the seed population for a value greater than a predetermined threshold value indicative of a termination condition,
    g) considering the next generation population as the seed population and iterating steps e) and f),
    and in response to determining that the fitness score for the next generation population differs from the fitness score of the seed generation population for a value lower than a predetermined threshold value indicative of a termination condition,
    h) determining locations of the environment for the deployment of the radio communication devices at the elementary areas of the map corresponding to the genes of the individuals of the determined next generation population that have said first value.

2. The computer-implemented method of claim 1, wherein said elementary areas are defined by superimposing to the map a grid having a predetermined granularity factor and each elementary area comprises a matrix of a predetermined plurality of pixels of an image of said map.

3. The computer-implemented method of claim 2, wherein said map is divided into a grid of elementary areas of equal extension arranged along rows and columns and the subsets representing individuals are rows or columns of the map.

4. The computer-implemented method of claim 1, wherein the map comprises representations of structures of the environment including obstacles, said representations of structures having respective attributes that are used to functionally identify each structure and are associated with one or more elementary areas, a gene of an individual being allowed to take on, or prevented from taking on said first value representative of the presence of a radio communication device at a location of the environment corresponding to the elementary area identified by said gene according to an attribute associated with said elementary area.

5. The computer-implemented method of claim 1, comprising extrapolating from the map attribute values of structures in the environment based on an intensity value of pixels in each elementary area, calculating a related occupation value of the elementary area and comparing said occupation value with a predefined threshold indicative of the minimum free space for receiving one radio communication device, whereby when the occupation value of the elementary area is greater than said predefined threshold, a gene of a defined individual identifying said elementary area is prevented from taking on said first value representative of the presence of a radio communication device.

6. The computer-implemented method of claim 5, wherein extrapolating from the map attribute values includes calculating an average intensity of the pixels in said elementary area and comparing said calculated average intensity of the pixels with a predefined intensity threshold indicative of a predetermined occupation threshold of an elementary area corresponding to the minimum free space for receiving one radio communication device, whereby when the average intensity of the pixels in an elementary area is greater than the predefined intensity threshold, a gene of a defined individual identifying said elementary area is prevented from taking on said first value representative of the presence of a radio communication device.

7. The computer-implemented method of claim 1, wherein said fitness function is calculated as a function of signal losses due to obstacles to radio communication in each elementary area and depends upon at least one of the following metrics: (i) the number of radio communication devices in said environment being lower than a predetermined maximum number of radio communication devices, which is dependent upon a spatial extension of said environment and a radio communication range of the radio communication devices; (ii) continuity of radio communication coverage of said environment, (iii) radio signal propagation quality indicators.

8. The computer-implemented method of claim 7, comprising optimizing the fitness score by minimizing a fitness function of the form $$\hat{P} = \sum_{k=1}^{\frac{n!}{(n-2)!2}} \left( P_{R_k} * \sum_{j=0}^{h} t_{k_j} \right) + \sum_{i=1}^{n} \sigma\left(P_{R_{i,t}}, P_{R_{i,s}}, P_{R_{t,s}}\right)$$

where:

$$P_{R_k} = P_T \frac{G_T G_R \lambda^2}{(4\pi)^2 R_k^2}$$

$R_k$ is the Euclidean distance between a pair of deployment sites $(P_i, P_j)$ of a set $(P_i)_{i=1,\ldots,n}$ of n deployment sites whose optimal arrangement in the environment is to be calculated, $G_T$ and $G_R$ are the gains of the antennas (compared to an isotropic antenna), $\lambda$ is the wavelength of the radio communication carrier, $t_{k_j}$ is a loss constant of the signal associated with the j-th obstacle belonging to a set of h detected obstacles between the two deployment sites and depends on thickness of the detected obstacles, $Pi_s$, $P_{i_t}$ are the sites closest to $P_i$ from a Euclidean viewpoint, and $\sigma$ is the standard deviation.

9. The computer-implemented method of claim 1, wherein said at least one predetermined evolutionary step comprises at least one of: (i) reproduction of selected parent individuals, (ii) crossover between a pair of individuals, (iii) mutation of at least one individual; (iv) elitism.

10. The computer-implemented method of claim 1, wherein a constraint is applied to an initial population and to each population generated by evolutionary steps and includes a predetermined maximum amount of radio communication devices.

11. The computer-implemented method of claim 10, wherein said predetermined maximum amount of radio communication devices is determined as a ratio between map size and coverage capability, or average coverage capability, of each radio communication device.

12. The computer-implemented method of claim 1, wherein a constraint is applied to an initial population and to each population generated by evolutionary steps and includes a predetermined minimum number of radio communication devices.

13. The computer-implemented method of claim 12, wherein said predetermined minimum number of radio communication devices is equal to three.

14. The computer-implemented method of claim 1, wherein a constraint is applied to an initial population and to each population generated by evolutionary steps and includes at least one predetermined minimum threshold radio visibility indicator.

15. The computer-implemented method of claim 14, wherein said at least one predetermined minimum threshold radio visibility indicator includes at least one of a Received Signal Strength Indicator (RSSI), a Channel Quality Indicator (CQI), a Connection Channel Information (CCI), a Reference Signal Received Quality (RSRQ), a Signal to Interference plus Noise Ratio (SINR), depending on a radio communications service provided by the radio communication devices in said environment.

16. A system for automated planning deployment of radio communication devices in an environment, comprising processing means configured to perform the computer-implemented method of claim 1.

* * * * *